United States Patent [19]
Constable et al.

[11] Patent Number: 5,574,521
[45] Date of Patent: Nov. 12, 1996

[54] OPTICAL FILM ENCODING APPARATUS

[75] Inventors: Douglas W. Constable; Randy E. Horning, both of Rochester, N.Y.

[73] Assignee: Eastman Kodak Company, Rochester, N.Y.

[21] Appl. No.: 585,004

[22] Filed: Jan. 11, 1996

[51] Int. Cl.$^6$ .................................................. G03B 17/24
[52] U.S. Cl. .............................................................. 396/315
[58] Field of Search ..................................... 354/105, 106

[56] References Cited

U.S. PATENT DOCUMENTS

| | | | |
|---|---|---|---|
| 5,121,311 | 6/1992 | Cheselske | 362/249 |
| 5,471,268 | 11/1995 | Jeong et al. | 354/106 |
| 5,517,266 | 5/1996 | Funaki et al. | 354/106 |

*Primary Examiner*—Michael L. Gellner
*Assistant Examiner*—John Chizmar
*Attorney, Agent, or Firm*—Roger A. Fields

[57] ABSTRACT

Optical film encoding apparatus comprising an LED with a pair of wire leads, and means for supporting the LED including its wire leads to precisely position the LED opposite a filmstrip to be optically encoded, is characterized in that the supporting means supports each one of the wire leads suitably bent at multiple angles to prevent stray ambient light from following the wire leads towards the filmstrip. Preferably, the supporting means includes a lead spreader which supports the wire leads bent at an initial one of the multiple angles closest to the LED in opposite directions to dynamically balance the deformation forces applied to the wire leads due to their being bent. This is done to prevent the deformation forces from otherwise tending to shift the LED from being precisely positioned relative to the filmstrip.

5 Claims, 6 Drawing Sheets

OPTICAL FILM ENCODING APPARATUS

FIELD OF THE INVENTION

The invention relates generally to the field of photography, and in particular to optical film encoding apparatus such as included in a camera. More specifically, the invention relates to an optical film encoding apparatus that uses a light-emitting diode (LED) to provide an optical encodement on a filmstrip.

BACKGROUND OF THE INVENTION

It is generally known for a camera to have an optical film encoding apparatus for providing a light-initiated encodement on a filmstrip in the camera each time a picture is taken. Typically, the optical film encoding apparatus comprises at least one LED with a pair of wire leads, and means for supporting said LED including its wire leads to precisely position the LED opposite the filmstrip.

A problem that may occur is that stray ambient light may follow the wire leads towards the filmstrip. If the stray light reaches the filmstrip, the picture and/or the encodement may be partly fogged.

SUMMARY OF THE INVENTION

Optical film encoding apparatus comprising an LED with a pair of wire leads, and means for supporting the LED including its wire leads to precisely position the LED opposite a filmstrip to be optically encoded, is characterized in that:

the supporting means supports each one of the wire leads suitably bent at multiple angles to prevent stray ambient light from following the wire leads towards the filmstrip.

Preferably, the supporting means includes a lead spreader which supports the wire leads bent at an initial one of the multiple angles closest to the LED in opposite directions to dynamically balance the deformation forces applied to the wire leads due to their being bent. This is done to prevent the deformation forces from otherwise tending to shift the LED from being precisely positioned relative to the filmstrip.

DETAILED DESCRIPTION OF THE INVENTION

The invention is disclosed as being embodied preferably in a camera. Because the features of a camera are generally known, the description which follows is directed in particular only to those elements forming part of or cooperating directly with the disclosed embodiment. It is to be understood, however, that other elements may take various forms known to a person of ordinary skill in the art.

Figure 1:
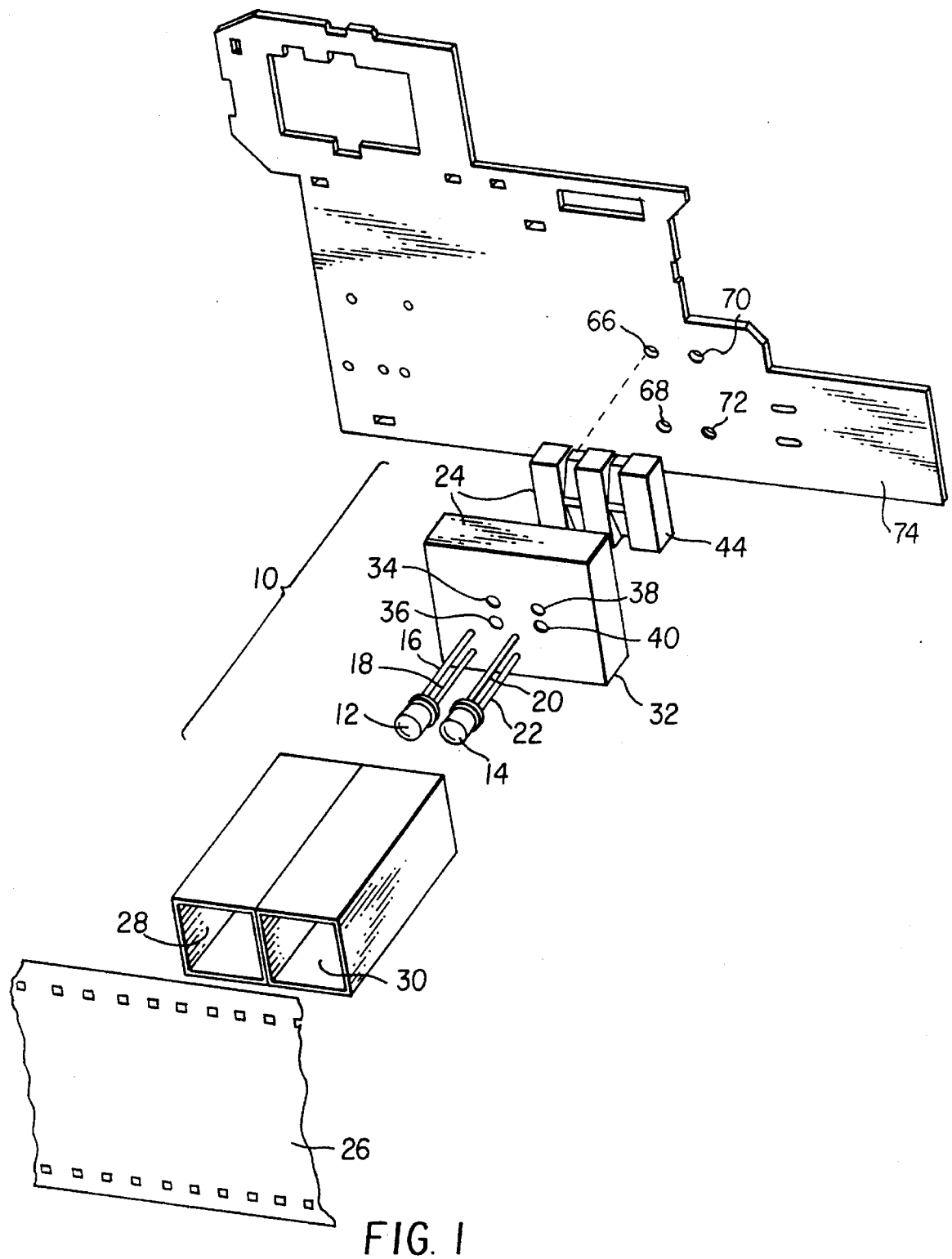
FIG. 1 is an exploded perspective view of the optical film encoding apparatus according to a preferred embodiment of the invention.
Figure 2:
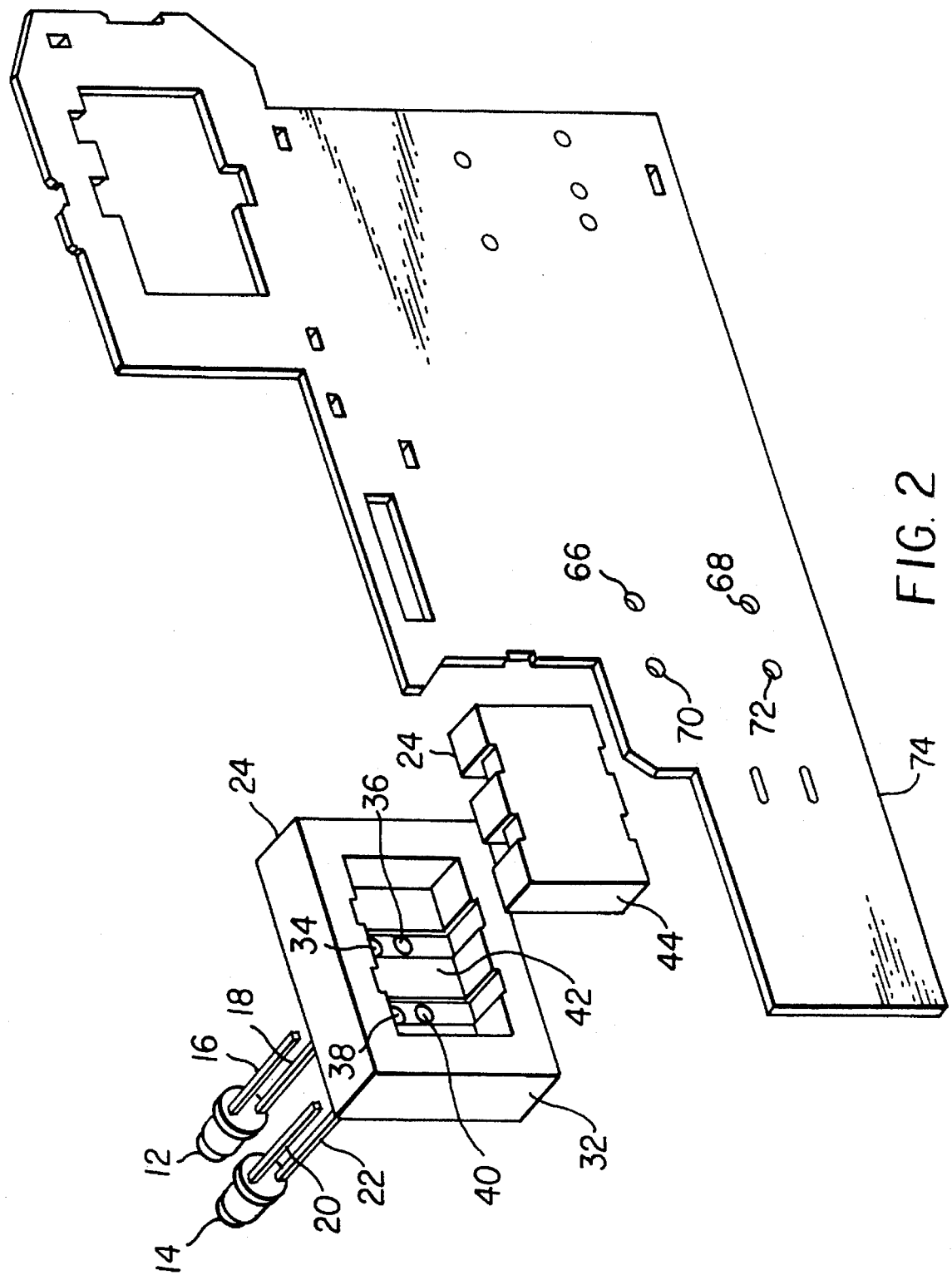
FIGS. 2, 3, 4 and 5 are perspective views of the optical film encoding apparatus successively depicting its assembly in a camera.
Figure 3:
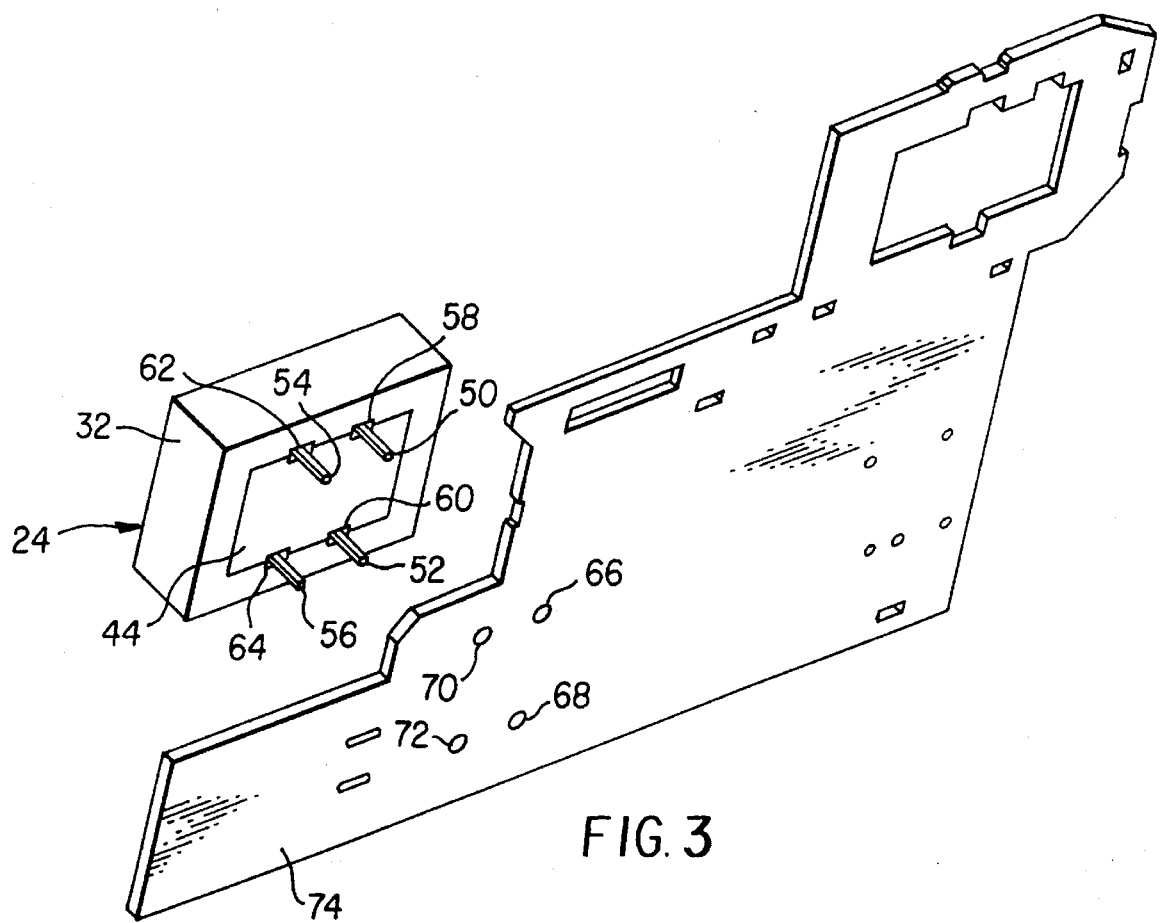
Figure 4:
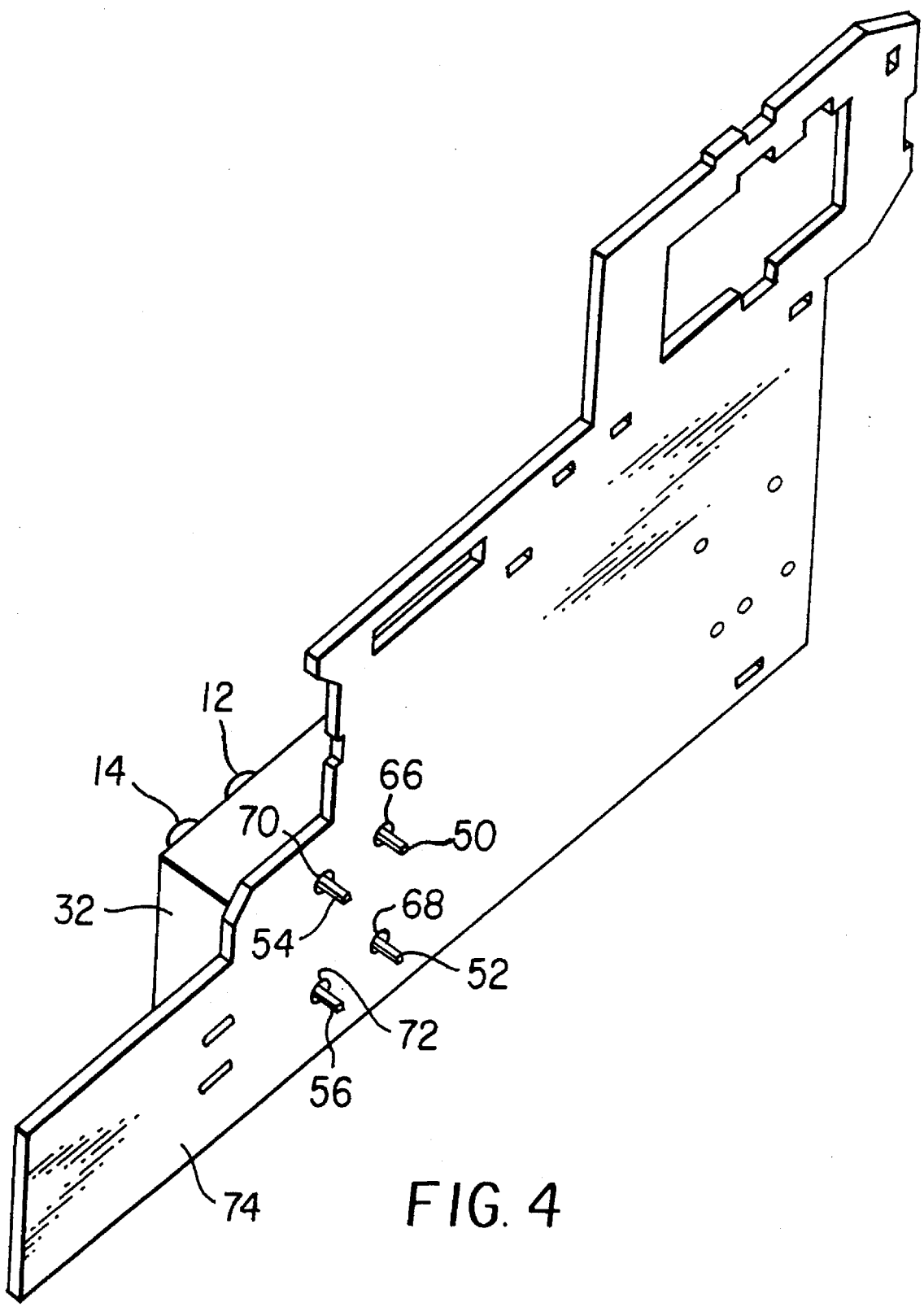
Figure 5:
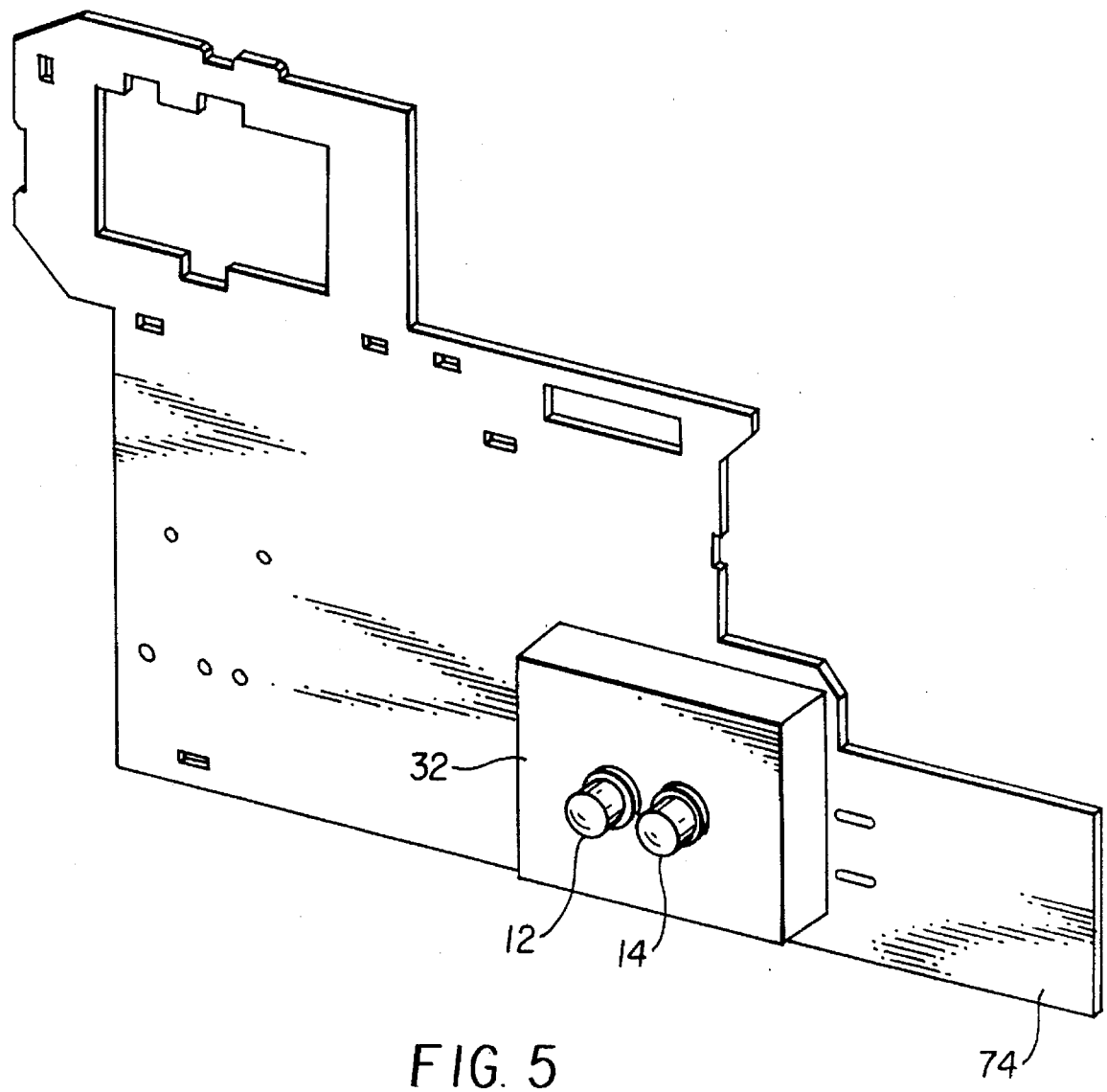
Figure 6:
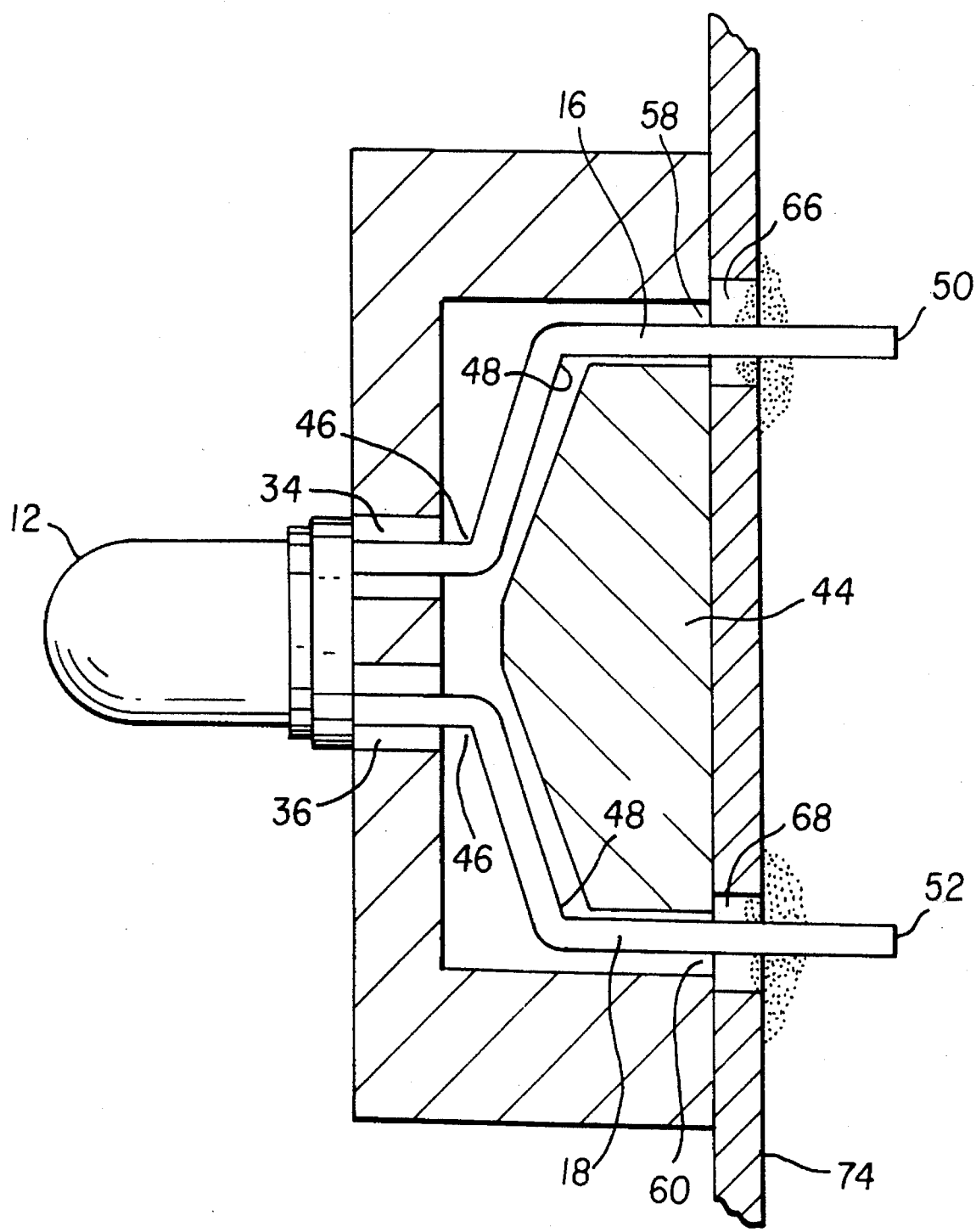
FIG. 6 is a partial sectional view of the optical film encoding apparatus.

Referring now to the drawings, FIGS. 1–6 show an optical film encoding apparatus 10 comprising two identical LEDs 12 and 14 with respective pairs of wire leads 16, 18 and 20, 22 and a means 24 for supporting the LEDs including their wire leads to precisely position the LEDs opposite a filmstrip 26 to be optically encoded.

Respective light tunnels 28 and 30 extend between the LEDs 12 and 14 and the filmstrip 26. See FIG. 1.

The means 24 for supporting the LEDs 12 and 14 includes a hollow holder block 32 having respective pairs of front openings 34, 36 and 38, 40 to a cavity 42 within the block for admitting the two pairs of wire leads 16, 18 and 20, 22 into the cavity. See FIGS. 1 and 2. A lead spreader 44 is snugly fit in the cavity 42 to support the two pairs of wire leads 16, 18 and 20, 22 suitably bent at multiple angles (60 degrees) 46 and 48 to prevent stray ambient light from following the wire leads towards the filmstrip 24. See FIGS. 3 and 6. In one instance, the lead spreader 44 supports the pair of wire leads 16 and 18 bent at the angle 46, which is closest to the LED 12, in opposite directions to dynamically balance the deformation forces applied to the wire leads due to their being bent and supports the wire leads bent at the angle 48, which is farthest from the LED, in a similar direction. Similarly, the lead spreader 44 supports the pair of wire leads 20 and 22 bent at the angle 46, which is closest to the LED 14, in opposite directions to dynamically balance the deformation forces applied to the wire leads due to their being bent and supports the wire leads bent at the angle 48, which is farthest from the LED, in a similar direction. The respective ends 50, 52, 54 and 56 of the wire leads 16, 18, 20 and 22 protrude from rear slots 58, 60, 62 and 64 between the block 32 and the lead spreader 44, through holes 66, 68, 70, and 72 in a printed circuit board 74, and are soldered to the board. See FIGS. 3, 5 and 6.

One and/or both of the LEDs 12 and 14 are energized to provide an optical encodement on the filmstrip 26. Alternatively, the LEDs 12 and 14 can always be energized but be selectively masked.

The invention has been described with reference to a preferred embodiment. However, it will be appreciated that variations and modifications can be effected by a person of ordinary skill in the art without departing from the scope of the invention.

| PARTS LIST |
| --- |
| 10. optical film encoding apparatus |
| 12. LED |
| 14. LED |
| 16. wire lead |
| 18. wire lead |
| 20. wire lead |
| 22. wire lead |
| 24. supporting means |
| 26. filmstrip |
| 28. light tunnel |
| 30. light tunnel |
| 32. holder block |
| 34. front opening |
| 36. front opening |
| 38. front opening |
| 40. front opening |
| 42. cavity |
| 44. lead separator |
| 46. angle |
| 48. angle |
| 50. lead end |
| 52. lead end |
| 54. lead end |
| 56. lead end |
| 58. rear slot |
| 60. rear slot |
| 62. rear slot |
| 64. rear slot |

| PARTS LIST |
|---|
| 66. hole |
| 68. hole |
| 70. hole |
| 72. hole |
| 74. printed circuit board |

We claim:

1. Optical film encoding apparatus comprising an LED with a pair of wire leads, and means for supporting said LED including its wire leads to precisely position the LED opposite a filmstrip to be optically encoded, is characterized in that:

said supporting means supports each one of said wire leads suitably bent at multiple angles to prevent stray ambient light from following the wire leads towards the filmstrip.

2. Optical film encoding apparatus as recited in claim 1, wherein said supporting means includes a lead spreader which supports said wire leads bent at an initial one of the multiple angles closest to said LED in opposite directions to dynamically balance the deformation forces applied to the wire leads due to their being bent.

3. Optical film encoding apparatus as recited in claim 2, wherein said lead spreader supports said wire leads bent at a final one of the multiple angles farthest from said LED in similar directions.

4. Optical film encoding apparatus as recited in claim 1, wherein a light tunnel extends between said LED and the filmstrip.

5. Optical film encoding apparatus as recited in claim 2, wherein said supporting means includes a hollow holder having front openings to a cavity within said holder for admitting said wire leads into said cavity and a lead spreader in the cavity supports the wire leads bent at an initial one of the multiple angles closest to said LED in opposite directions to dynamically balance the deformation forces applied to the wire leads due to their being bent and supports the wire leads bent at a final one of the multiple angles farthest from the LED in a similar direction.

* * * * *